United States Patent [19]

Bidlack et al.

[11] 4,001,517
[45] Jan. 4, 1977

[54] DIRECT STATION SELECTION HOLD ARRANGEMENT

[75] Inventors: Richard Henry Bidlack, Boonton; Wayne Jay Egan, Eatontown; Steven Gary Miller, Freehold, all of N.J.

[73] Assignee: Bell Telephone Laboratories, Incorporated, Murray Hill, N.J.

[22] Filed: Nov. 3, 1975

[21] Appl. No.: 628,076

[52] U.S. Cl. .................................................. 179/99
[51] Int. Cl.$^2$ ............................................. H04M 1/00
[58] Field of Search ............ 179/1 H, 1 HF, 1 VC, 179/18 BB, 18 AD, 18 BF, 81 B, 99

[56] References Cited
UNITED STATES PATENTS

| | | | |
|---|---|---|---|
| 3,395,255 | 7/1968 | Clement | 179/81 B |
| 3,553,386 | 1/1971 | Golembeski | 179/1 HF |
| 3,787,640 | 1/1974 | Bush et al. | 179/99 |
| 3,860,756 | 1/1975 | Shinoi et al. | 179/1 HF |
| 3,872,262 | 3/1975 | Kerman | 179/99 |
| 3,898,392 | 8/1975 | Jackson | 179/99 |
| 3,927,278 | 12/1975 | Tsutsumi et al. | 179/99 |
| 3,928,732 | 12/1975 | Simon et al. | 179/99 |

*Primary Examiner*—William C. Cooper
*Assistant Examiner*—Gerald L. Brigance
*Attorney, Agent, or Firm*—David H. Tannenbaum

[57] ABSTRACT

A key telephone system is disclosed in which a direct station selection (DSS) arrangement reduces the number of operations required for the attendant to extend an incoming central office call to a station. The operation of one or more DSS keys on any of the attendant consoles in the key telephone system automatically places the calling central office line on hold and establishes a communication path through the DSS key contacts from the attendant to the selected station. DC bias on this communication path activates a loudspeaker and microphone arrangement in the selected station so the called party may converse with the attendant "hands-free." Additionally, the DSS arrangement provides the capability of utilizing any station in the key telephone system as the attendant position.

13 Claims, 4 Drawing Figures

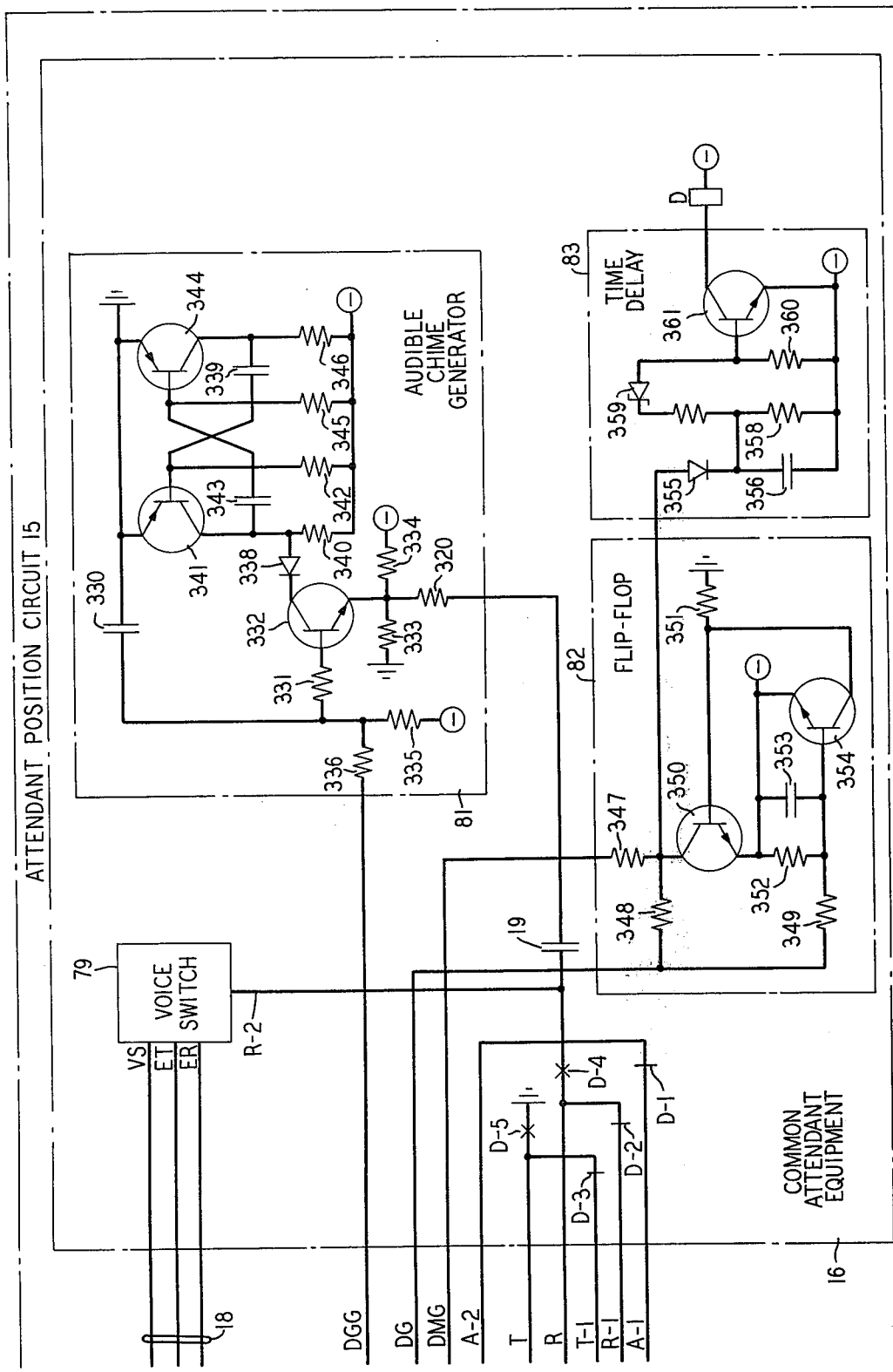

DIRECT STATION SELECTION HOLD ARRANGEMENT

FIELD OF THE INVENTION

This invention relates to a key telephone system and in particular to a Direct Station Selection (DSS) arrangement which, in response to the operation of a DSS key, automatically places an incoming central office call on hold while the directly selected station communicates "hands-free" with the attendant. Provisions are also made for utilizing any station in the key telephone system as the attendant console.

DESCRIPTION OF PRIOR ART

In business communication systems it is common practice and obviously desirable to provide the attendant with facilities for placing incoming central office calls on hold. This enables the attendant to communicate with the subscriber to whom a central office call is directed while ensuring privacy of the communication.

These facilities generally comprise common equipment as well as a special attendant console equipped with a plurality of push button keys. One key is an intercom key, one key is a hold key so that one call may be placed on hold while another is originated on the intercom line, one key is a release key so that the attendant may release from an existing call connection. The attendant console is also equipped with Direct Station Selection (DSS) keys on a one per station basis. These DSS keys eliminate the need for dialing since the attendant can signal a station by merely depressing the DSS key associated with that station. The subscriber at the called station answers this signal by picking up the intercom line to communicate with the attendant.

One such prior art arrangement is shown by the teaching of S. Kerman, U.S. Pat. No. 3,872,262 issued Mar. 18, 1975. The Kerman patent shows the use of the DSS buttons to activate an automatic hold circuit, which places the calling central office party on hold while the attendant communicates with the selected station.

The Kerman patent also shows each station in the key telephone system equipped with speakerphone facilities such that the attendant can signal the called party by paging. This is accomplished by activating a station selection network in response to the operation of a DSS key on the attendant console. In Kerman, the attendant console transmits enable signals through this network to activate the selection circuitry in the called station set. The selection circuitry, in turn, activates the speakerphone facilities in the selected station set and connects these speakerphone facilities to a dedicated attendant intercom link, such that the called party may converse "hands-free" with the attendant by utilizing the activated speakerphone facilities.

The disadvantage of the prior art arrangements is that extensive circuitry is required to implement them. For example, each station is equipped with complex speakerphone facilities as well as selection circuitry. In addition, a station selection network is required to activate the speakerphone facilities in the station selected by the operation of the DSS key.

In view of the foregoing, in telephone switching systems there is a need for expeditious attendant handling of calls. This is especially true of telephone systems handling a large volume of attendant served calls. To accomplish this objective, it is desirable to minimize the number of operations required for the attendant to process a call.

It is also desirable to minimize the length of time required for each of these operations. This is especially true with respect to the operation of alerting a station to which an incoming central office call is to be completed.

It is also desirable to minimize the cost and complexity of the attendant circuitry.

In view of the foregoing, an object of this invention is to provide attendant facilities that minimize the number of operations required to place a call on hold and extend an incoming central office call to a station.

It is a further objective of this invention to provide facilities that enable the station user to communicate "hands-free" with the attendant.

It is a further objective of this invention to eliminate the need for an attendant console.

It is a further objective of this invention to provide attendant facilities that are of less cost and complexity than prior art arrangements.

SUMMARY OF THE INVENTION

In accordance with our invention, we provide facilities for expediting the attendant handling of incoming central office calls. This is accomplished by providing each attendant with both automatic hold and voice signaling facilities while each station is equipped with loudspeaker and microphone facilities. Simplicity of operation is obtained by activating these facilities simultaneously by the operation of any DSS key on any of the attendant consoles.

An attendant answers an incoming central office call by depressing the associated central office line key and picking up the handset. The attendant determines the identity of the station to which this call is to be directed, and then places this call on hold so that the called station party can be contacted.

These two operations, holding the central office line and contacting the called station, are accomplished in this invention simply by the operation of any of the DSS keys on the attendant console. The operation of any DSS key activates the automatic hold circuit, placing the central office line on hold. Additionally, a communication path is completed through the DSS key contacts between the attendant and the selected station. DC bias on this communication path activates the loudspeaker and microphone arrangement in the selected station and the attendant may immediately speak with the called party.

All signaling is done over the communication path established by the DSS key contacts and the called party need not manipulate the telephone set in any way to converse with the attendant. Thus, attendant handling of incoming central office calls is expedited because the two functions of holding the central office line and signaling the called station party is accomplished with one operation — depressing the appropriate DSS key. Additionally, the attendant need not wait for the called party to answer a ringing phone, but, instead, can immediately converse with him via the activated loudspeaker and microphone arrangement in the telephone set.

The multifunction nature of the DSS key demonstrated by this invention also eliminates the need to provide the attendant with numerous special purpose keys. Thus, by utilizing the facilities described by this invention, any of the key telephone sets used in this key telephone system can be substituted for the attendant console. All that is required is the addition of a DSS key unit and its associated common equipment to convert any standard key telephone set to an attendant position.

Accordingly, it is a feature of the invention to provide, in a telephone switching system, attendant hold facilities which automatically place an incoming central office call on hold in response to the operation of any one or more DSS keys by an attendant.

A further feature of the invention is the provision of facilities for immediately enabling voice communication between an attendant and the station or stations selected by the operation of one or more of the DSS keys by that attendant.

A further feature of the invention is the provision of facilities for establishing a communication path between the attendant and the selected station through the DSS key contacts associated with the DSS key operated by the attendant.

A further feature of the invention is the provision of facilities for enabling the subscriber at each selected station to answer the attendant's call "hands-free", where such facilities are exclusively activated and controlled by signals on the communication path established between the attendant and the station.

A further feature of the invention is the provision of facilities which enable the use of any standard key telephone set as an attendant position by the addition of a DSS key unit.

BRIEF DESCRIPTION OF THE DRAWING

The operation and utilization of the present invention will be more fully apparent from the following description of the drawing, in which:

FIGS. 2 and 3 are a detailed circuit diagram of a preferred embodiment of the invention; and FIG. 4 shows the manner in which FIGS. 2 and 3 should be arranged.

GENERAL DESCRIPTION — FIG. 1

Figure 1:
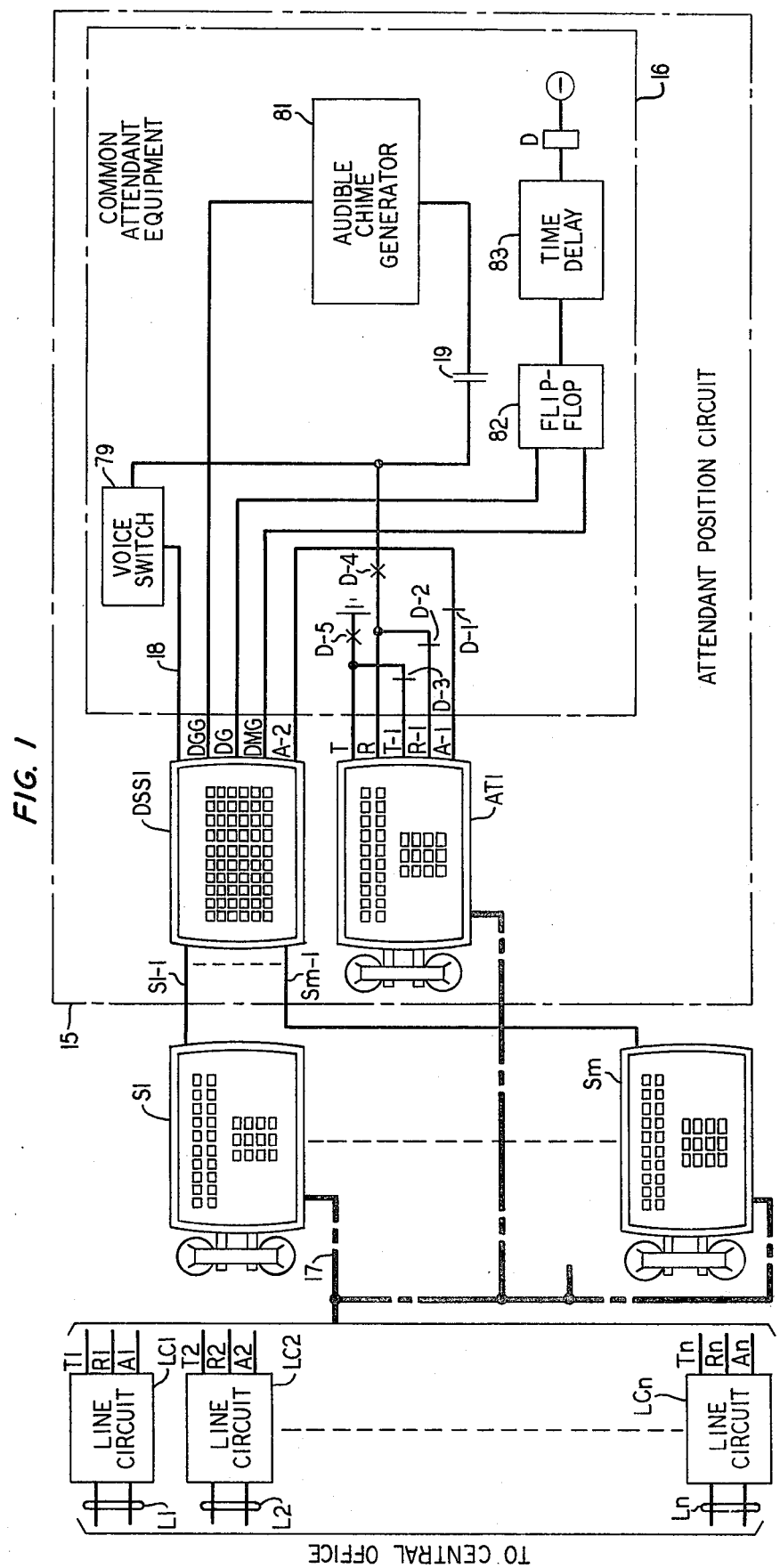
FIG. 1 illustrates one embodiment of the invention in block diagram form.

FIG. 1 shows one embodiment of our invention wherein a number of central office lines Ll through Ln and a number of key telephone station sets S1 through Sm are connected to one of the attendant position circuits 15 in the key telephone system. The attendant position circuitry consists of a key telephone station set AT1, a direct station selection key unit DSS1, and common attendant equipment 16.

Each incoming central office line is connected to one of line circuits LC1 through LCn that interfaces the key telephone system with the central office. Each line circuit, in turn, is connected to a particular line pickup key on attendant key telephone set AT1 as well as to a particular line pickup key at each station set Sl-Sm. These line pickup keys are used by the attendant and by the station users to access the incoming central office lines.

Similarly, each station is connected via dedicated communication paths Sl-1 through Sm-1 to a corresponding DSS key on attendant DSS key unit DSS1. The attendant can establish a communication connection to a particular station by merely picking up the handset and depressing the DSS key corresponding to that station. Each station is also equipped with loudspeaker and microphone facilities so that a subscriber can respond to a call by communicating "hands-free" without having to manipulate the station set.

The invention can be further appreciated by describing the extension of a typical incoming central office call to a particular station via the attendant. Assume an incoming central office call arrives on central office line Ll. The attendant answers this call by picking up the communication handset at attendant key telephone station AT1 and, by depressing the associated line pickup key, the attendant is connected through line circuit LC1 to central office line Ll.

To extend this call to a station (assume station Sl) the attendant must first place the central office line on hold and then voice signal the selected station. When station Sl answers, the attendant then connects the central office line to the station and releases.

Both the hold function and the call extension function in the disclosed embodiment are accomplished by the attendant simply depressing the DSS key associated with the selected station, station Sl. The operation of this DSS key on the DSS console DSS1 removes ground from the A lead, causing line circuit LC1 to place central office line Ll on hold. Additionally, the operation of the DSS key places a signal on lead DG, activating flip-flop 82. The change in state of the flip-flop activates time delay circuit 83 which, in turn, operates relay D.

The operation of the DSS key also serves to connect the attendant with station Sl. This is accomplished when relay D operates, establishing a communication path from the attendant station to voice switch 79 through operated relay contact D-4. The output of the voice switch is connected through the contacts of the operated DSS key to station Sl via dedicated DSS communication path Sl-1 associated with station Sl. DC bias on this DSS communication path, Sl-1 activates the loudspeaker and microphone facilities at station Sl.

At the same time, the operated DSS key places a signal on lead DGG which momentarily activates audible chime generator 81. This chime generator applies an audible tone through coupling capacitor 19 to the input of voice switch 79. This audible tone is transmitted by the voice switch over the communication path established by the operated DSS key contacts to the activated loudspeaker of station Sl.

The application of this burst of audible tone to the activated loudspeaker at station Sl alerts the subscriber at station Sl that an incoming call has been extended to station Sl. The attendant may immediately communicate with the subscriber at station Sl, utilizing the activated loudspeaker at station Sl. The subscriber need not manipulate the station set to communicate with the attendant and can utilize the activated loudspeaker and microphone arrangement for the duration of the conversation with the attendant.

To extend the central office call to the station, the attendant need not perform any further call processing operations. The attendant can go on-hook and the central office call will remain on hold. The central office line is removed from hold and is connected to the subscriber when the subscriber operates the associated central office line pickup key at the called key telephone station set Sl.

Figure 2:
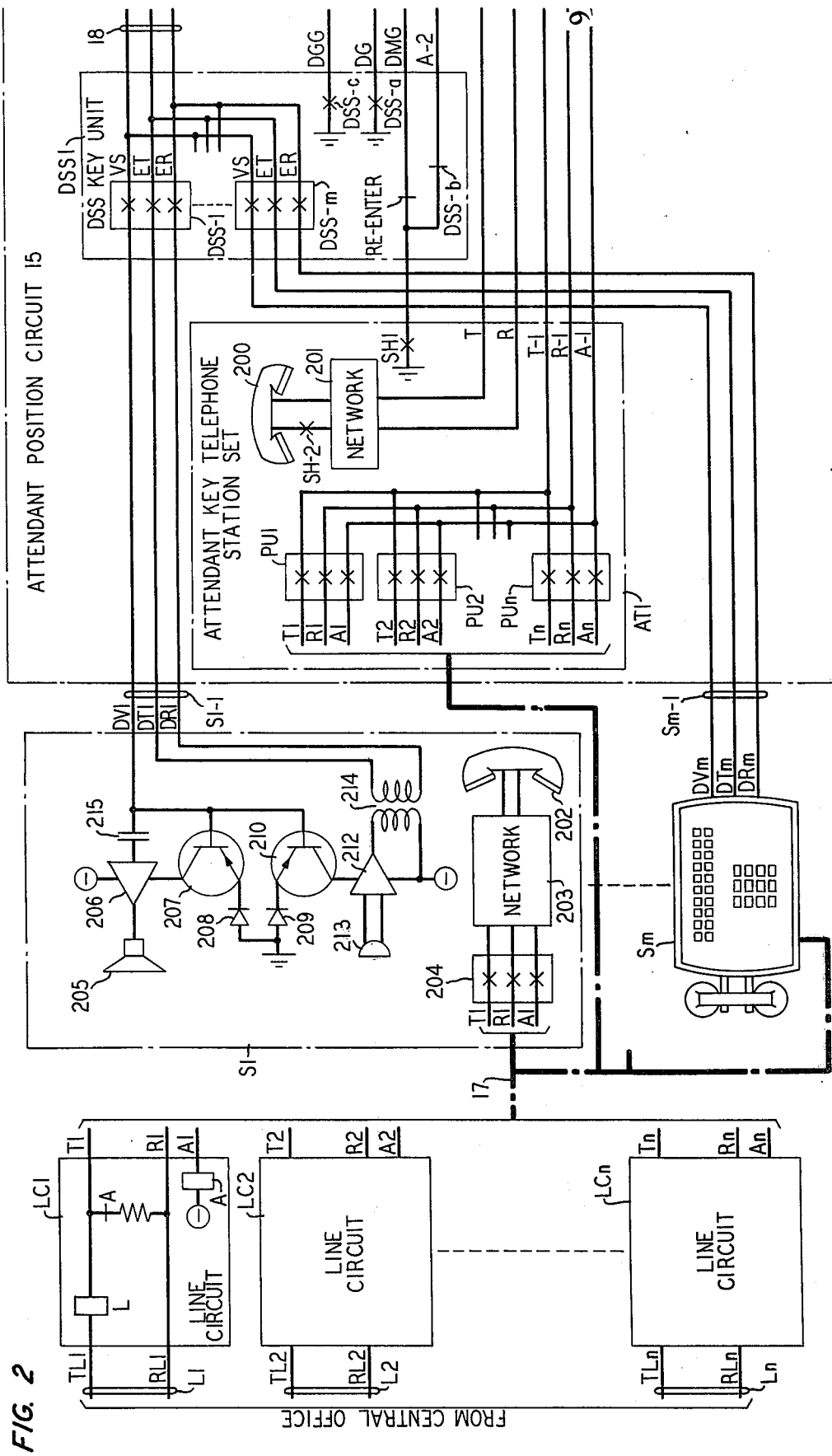

DETAILED DESCRIPTION — FIGS. 2 through 4

Drawing FIGS. 2 and 3 when arranged with respect to each other as shown in FIG. 4, illustrate how the various elements of our inventive embodiment cooperate to provide the attendant DSS features. The various equipments such as line circuits, key telephone station sets, etc. are oriented with respect to each other on FIGS. 2 and 3 in a manner analogous to that of FIG. 1.

The description of FIGS. 2 and 3 is made with respect to the same call conditions assumed for FIG. 1; namely, a central office call is incoming to the attendant on central office line Ll and is to be extended to station Sl.

LINE CIRCUIT

Central office line Ll is terminated on line circuit LCl. These line circuits are a basic part of key telephone systems and are well known in the art. The line circuit used in the present disclosure is of the type taught by R. E. Barbato et al, U.S. Pat. No. 3,436,488, issued Apr. 1, 1969. These line circuits perform many functions, one of which is signaling a particular subscriber station in response to the detection of ringing from the central office. Another function of interest in this disclosure is the line hold function performed by the line circuit. This function involves the line circuit, in response to a signal from the key telephone system, placing the incoming central office line in an active but noncommunicating condition so that the subscriber can communicate on another line. Means are also provided in the line circuit for the release of the central office line from hold in response to signals from either the central office or a key telephone station.

INCOMING CALL TO ATTENDANT

Returning to the call in progress, line circuit LCl detects the application of ringing to central office line Ll and provides an incoming call indication to attendant key telephone station set AT1. The attendant picks up the incoming call on central office line Ll by removing communication handset 200 from the switchhook (not shown) and then depressing line pickup key PU1 on attendant key telephone station set AT1 associated with the incoming central office call.

The operation of line pickup key PU1 cuts through the T, R, and A leads associated with line circuit Ll, which in this case are leads T1, R1 and A1 to common attendant equipment 16 shown in FIG. 3 via lead T-1, R-1 and A-1. In common attendant equipment 16, conductors T-1 and R-1 are further switched through break contacts D-2 and D-3 of nonoperated relay D and via leads T and R and network 201 (FIG. 2) and switchhook contact SH-2 to handset 200 of attendant key telephone station set AT1. Thus, a communication connection is established from the handset of attendant key telephone station set AT1 to line circuit LCl. Ground from operated switchhook contact SH-1 is extended by DSS key unit DSS1 and released break contact DSS-b and over lead A-2 to common attendant equipment 16 (FIG. 3) and via released break contact D-1 and over lead A-1 and through enabled pickup key PU1 to lead A1. This ground is extended to associated line circuit LCl causing that line circuit to extend this communication connection to central office line Ll. Thus, a communication path is completed from attendant key telephone station set AT1 to central office line Ll.

INCOMING CALL EXTENDED TO STATION

The attendant may now converse with the central office party to determine the identity of the subscriber to whom this central office call is directed. The attendant must then place the central office line on hold and signal the station to which this call is to be extended. These two functions are automatically accomplished by the attendant operating the DSS key associated with the called station.

As discussed, since this call is to be extended to station Sl, the attendant depresses DSS key DSS-1 associated with station Sl. The operation of any DSS key causes common DSS contacts DSS-a, DSS-b, and DSS-c to operate. Ground applied through switchhook contact SH-1 is removed from the A1 lead by the operation of the DSS common break contact DSS-b, causing line circuit LCl to place a central office line Ll on hold.

When DSS common make contact DSS-a operates, ground is placed on lead DG where it is extended to flip-flop 82 in attendant common equipment 16. Flip-flop 82 is normally reset with the transistor 350 ON and transistor 354 OFF. The ground on lead DG supplied by contact DSS-a turns ON transistor 354 which, in turn, turns OFF transistor 350, thus setting flip-flop 82. The current normally flowing through transistor 350 now becomes the output current of flip-flop 82, flowing through resistors 347 and 348 to the input of time delay 83, activating this circuit.

The output current of flip-flop 82 flows through diode 355 of time delay 83 and begins to charge capacitor 356. This capacitor charges until the voltage across it is sufficient to break down Zener diode 359. The values of the time delay elements 356 through 361 have been selected so that it requires a minimum of approximately 70 milliseconds for the capacitor voltage to reach the Zener breakdown voltage. Thus, 70 milliseconds after flip-flop 82 is set, Zener diode 359 fires, turning ON transistor 361 which drives relay D. This time delay duration has been selected to provide sufficient time for the line circuit to place the central office line on hold before relay D operates and opens the communication connection (leads T1 and R1) to the line circuit.

When relay D operates, break contact D-1 of relay D opens the A-1 lead and maintains the open condition of this lead which was initiated by the previously mentioned DSS-b contact. Enabled break contacts D-2 and D-3 open the communication connection from the attendant to line circuit LCl. At the same time a communication connection is established from voice switch 79 over lead R-2 and enabled make contact D-4 and lead R to the attendant key telephone station set. Ground is provided on lead T via enabled make contact D-5.

VOICE SWITCH

Voice switching communication circuits are well known, especially in the loudspeaking telephone art. The voice switch circuit taught by F. J. Clement, U.S. Pat. No. 3,395,255, issued Jul. 30, 1968 is illustrative of the type of voice switch used in the disclosed embodiment. A voice switch circuit enables conventional 2-wire station sets, such as attendant key telephone station set AT1, to communicate with loudspeaker and microphone equipped stations (Sl through Sm), which require two unidirectional communication paths.

In the disclosed embodiment, each key telephone station set is associated with loudspeaker and microphone facilities, herein represented by elements 205 through 215 in called set Sl. These facilities comprise an amplifier 206 which amplifies incoming voice signals on lead DV1 and applies the amplified signals to loudspeaker 205. The output of microphone 213 is amplified by amplifier 212 and applied to leads DT1 and DR1, through transformer 214. Amplifiers 206 and 212 are normally in the OFF state, being under control of transistors 207 and 210 respectively.

The operation of the DSS key associated with station Sl connects voice switch 79 and leads VS, ET and ER thereof with the two unidirectional communication paths, comprising leads DV1 and DT1, DR1 extending to station Sl via the operated DSS key contacts DSS-1 associated with the operated DSS key. Lead DV1 provides a unidirectional communication path from voice switch 79 to station Sl and leads DT1 and DR1 provide a unidirectional communication path in the reverse direction.

Thus, a communication path is completed, via the DSS contacts, from attendant key telephone station AT1 to station Sl. Voice switch 79 maintains a dc bias on its output, lead VS. This dc bias passes through operated DSS key contacts DSS-1 to lead DV1. This dc bias on lead DV1 of the communication path activates transistors 207 and 210 of station Sl. Power is now applied to amplifiers 206 and 210 and the loudspeaker and microphone arrangement in station Sl is activated and can now be utilized by the subscriber at station Sl. The subscriber can immediately converse with the attendant "hands-free" by utilizing the activated loudspeaker and microphone arrangement and need not manipulate the station set for the duration of the conversation.

Meanwhile, the operation of the DSS key performs one other function, and that is to alert the subscriber that an incoming call has been extended to his telephone set. This is accomplished simultaneously with placing the central office line on hold and establishing a communication connection to the selected station.

The common momentary make DSS contact DSS-c momentarily places ground on lead DGG. This momentary ground charges capacitor 330 of audible chime generator 81, thus activating the chime generator.

Resistors 340, 342, 345, 346, transistors 341, 344, and capacitors 343, 339 of audible chime generator 81 comprise a free-running collector-coupled astable multivibrator.

The operation of a multivibrator such as disclosed here is well known in the art and is described in the textbook, "Pulse, Digital, and Switching Waveforms", by Millman and Taub, McGraw-Hill, 1965, pages 438 through 442. For the purposes of this invention, it is sufficient to note that the multivibrator produces an ac output signal, the time period of which is determined by the internal elements of the multivibrator.

The output of this multivibrator is coupled via diode 338 to the switching circuitry of audible chime generator 81, consisting of capacitor 330, diode 338, transistor 332 and resistors 331, 333, 334, 335 and 320. Initially transistor 332 of this switching circuit is biased in the OFF state by resistors 331, 333, 334, 335. Since the momentary operating DSS contact DSS-c has charged capacitor 330 through resistor 336, transistor 332 is driven ON which switches the previously mentioned output of the multivibrator through resistor 320 and coupling capacity 19 to the input of voice switch 79, providing a momentary audible tone to the called station. The voltage across capacitor 330 decays exponentially and, as a result, the voltage base drive of transistor 332 also decays exponentially. Thus, the output signal of audible chime generator 81 as supplied through transistor 332 consists of an exponentially decaying audible chime.

The duration of this audible signal is determined by the turn-off time of the switching circuitry of audible chime generator 81. The various elements in this disclosed embodiment have been selected to provide an audible signal of approximately 0.5 seconds duration.

This audible signal is applied to the input of voice switch 79 and thereon through the DSS contacts DSS-1 to the activated loudspeaker of selected subscriber station Sl. This tone serves to alert the subscriber at station Sl that an incoming call has been extended to the station set. Coextensively, the communication connection is completed between the attendant and the subscriber station set and the attendant may immediately communicate with the subscriber or may page him if necessary. Thus, operation of the DSS key by the attendant simultaneously places the incoming central office call on hold, establishes a communication connection between attendant and the selected subscriber, and also provides an alerting tone to the subscriber.

If the called station does not respond to the attendant's call, the attendant may reenter the held CO line by simply operating the REENTER key (not shown). The operation of the REENTER key causes the operation of the REENTER break contact (in DSS key unit DSS 1 on FIG. 2) to remove the ground from lead DMG. The open on lead DMG causes flip-flop 82 to reset, releasing relay D. Relay D released connects leads T and R to leads T-1 and R-1 via released relay D break contacts D-2 and D-3, thus reconnecting the attendant to the held CO line.

The attendant releases from this call by either replacing the handset on the switchhook or by releasing the operated DSS key. Either action removes ground from lead DMG resetting common attendant equipment 16. Additionally, the A lead remains open so that line circuit LC1 maintains central office line Ll in the hold state. Station Sl may remove the central office line from hold by operating the line pickup key on the key telephone set associated with central office line Ll.

Conclusion

While a specific embodiment of the invention has been disclosed, variations in procedural and structural detail within the scope of the appended claims are possible, and are contemplated. There is no intention of limitation to what is contained in the abstract of the exact disclosure as herein presented. The above-described arrangements are only illustrative of the application of the principles of the invention. Normally, other arrangements may be devised by those skilled in the art without departing from the spirit and scope of the invention.

What is claimed is:

1. In a key telephone system, a direct station selection arrangement comprising:
   a plurality of key telephone station sets;
   at least one attendant position circuit, wherein said attendant position circuit comprises:
   a communication handset,
   a plurality of dedicated communication paths corresponding on a one-to-one basis to each of said plurality of key telephone station sets for connecting said attendant position circuit to said key telephone station sets, a plurality of direct station selection key means connected on a one-to-one basis to each of said plurality of dedicated communication paths, wherein each said key telephone station set has associated therewith:

a loudspeaker, means for amplifying voice signals appearing on said dedicated communication path corresponding to said key telephone station set, means for applying said amplified signals to said loudspeaker; and wherein each of said direct station selection key means is operable for establishing a communication path from said attendant communication handset through said direct station selection key means and via said corresponding dedicated communication path to the key telephone station set corresponding to said direct station selection key means such that any voice signal generated at said communication handset is applied to said loudspeaker at said key telephone station set.

2. The invention of claim 1 wherein said key telephone system additionally comprises:

at least one central office line;

at least one line circuit means for interconnecting any one of said key telephone sets and said attendant position circuit to said corresponding central office line; and wherein said attendant position circuit additionally comprises line pickup key means for connecting said attendant position circuit to any selected one of said line circuit means.

3. The invention of claim 1 wherein said key telephone system additionally comprises:

means operable in response to the operation of any said direct station selection key means for generating a distinct audible tone burst, and means responsive to the enabling of said generating means for applying said audible tone burst to the communication path corresponding to the operated direct station selection key means.

4. The invention of claim 3 wherein said attendant position circuit additionally comprises:

a common attendant communication path for connecting said attendant position circuit to all of said key telephone station sets, and voice switch means for interfacing said communication handset with said common attendant communication path and said dedicated communication path.

5. The invention of claim 4 wherein each said key telephone station set additionally comprises:

a microphone, means for amplifying signals representing the output of said microphone, means for applying said amplified signals to said common attendant communication path, and means operable in response to the operation of the direct station selection key means corresponding to said key telephone set for activating said microphone amplifying means and said microphone application means of said key telephone station set such that a subscriber at said key telephone station set can communicate with the attendant over said common attendant communication path via said voice switch means.

6. The invention of claim 5, wherein said loudspeaker amplifying means, said loudspeaker application means, and said microphone activation means in said key telephone station set are enabled by a dc bias placed on said dedicated communication path corresponding to said key telephone station set by said direct station selection key means.

7. In a key telephone system, a direct station selection arrangement comprising:

a plurality of key telephone station sets;

at least one central office line;

at least one line circuit means corresponding on a one-to-one basis to each said central office line for interconnecting any one of said key telephone station sets to said corresponding central office line, said line circuit means comprising means for holding said corresponding central office line in an active noncommunicating condition;

at least one attendant position circuit, wherein said attendant position circuit comprises:

a communication handset, a plurality of dedicated communication paths corresponding on a one-to-one basis to each of said plurality of key telephone station sets for connecting said attendant position circuit to said key telephone station sets, a plurality of direct station selection key means connected on a one-to-one basis to each of said dedicated communication paths, line pickup key means for connecting said attendant position circuit to any selected one of said line circuit means, means responsive to the operation of one or more of said direct station selection key means while said attendant position circuit is connected to an incoming call on one of said line circuit means for activating said line circuit hold means; and wherein each said key telephone station set has associated therewith:

a loudspeaker, means for amplifying voice signals on said dedicated communication path corresponding to said key telephone station set, means for applying said amplified signals to said loudspeaker means;

wherein each of said direct station selection key means is operable for establishing a communication path from said attendant position circuit through said direct station selection key means and via said corresponding dedicated communication path to the key telephone station set corresponding to said direct station selection key means such that any voice signal generated at said attendant communication handset is applied to said loudspeaker at said key telephone station set.

8. The invention of claim 7 wherein said attendant position circuit additionally comprises time delay means, said time delay means being concurrently enabled upon the activation of said line circuit hold means for delaying the connection of said attendant communication handset to said established communication path for a length of time sufficient to enable said line circuit hold means to place said central office line in an active noncommunicating condition.

9. The invention of claim 7 wherein said key telephone system additionally comprises:

means operable in response to the operation of any said direct station selection key means for generating a distinct audible tone burst, and means responsive to the enabling of said generating means for applying said audible tone burst to the communication path corresponding to the operated direct station selection key means.

10. The invention of claim 9 wherein said attendant position circuit additionally comprises:
a common attendant communication path for connecting said attendant position circuit to all of said key telephone station sets, and
voice switch means for interfacing said communication handset with said common attendant communication path and said dedicated communication path.

11. The invention of claim 10 wherein each said key telephone station set additionally comprises:
a microphone,
means for amplifying signals representing the output of said microphone,
means for applying said amplified signals to said common attendant communication path, and
means operable in response to the operation of the direct station selection key means corresponding to said key telephone station set for activating said microphone amplifying means and said microphone application means of said key telephone station set such that the subscriber at said key telephone station set can communicate with the attendant over said common attendant communication path via said voice switch means.

12. The invention of claim 11 wherein said loudspeaker amplifying means, said loudspeaker application means, and said microphone activation means in said key telephone station set are enabled by a dc bias placed on said dedicated communication path corresponding to said key telephone station set by said direct station selection key means.

13. In a key telephone system, a direct station selection arrangement comprising:
a plurality of key telephone station sets;
at least one central office line;
at least one line circuit means corresponding on a one-to-one basis to each said central office line for interconnecting any one of said key telephone station sets to said corresponding central office line, said line circuit means comprising means for holding said corresponding central office line in an active noncommunicating condition;
at least one attendant position circuit, wherein said attendant position circuit comprises:
a plurality of dedicated communication paths corresponding on a one-to-one basis to each of said plurality of key telephone station sets for connecting said attendant position circuit to said key telephone station sets,
a plurality of direct station selection key means connected on a one-to-one basis to each of said dedicated communication paths,
line pickup key means for connecting said attendant position circuit to any selected one of said line circuit means,
means responsive to the operation of one or more of said direct station selection key means while said attendant position circuit is connected to an incoming call on one of said line circuit means for activating said line circuit hold means,
wherein each said key telephone station set has associated therewith:
a loudspeaker,
means for amplifying voice signals on said dedicated communication path corresponding to said key telephone station set,
means for applying said amplified signals to said loudspeaker means;
wherein said attendant position additionally comprises:
one of said key telephone stations sets; and
wherein each of said direct station selection key means is operable for establishing a communication path from said attendant key telephone station set through said direct station selection key means and via said corresponding dedicated communication path to the key telephone station set corresponding to said direct station selection key means such that any voice signal generated at said attendant key telephone station set is applied to said loudspeaker at said key telephone station set.

* * * * *